United States Patent Office 3,319,259
Patented May 9, 1967

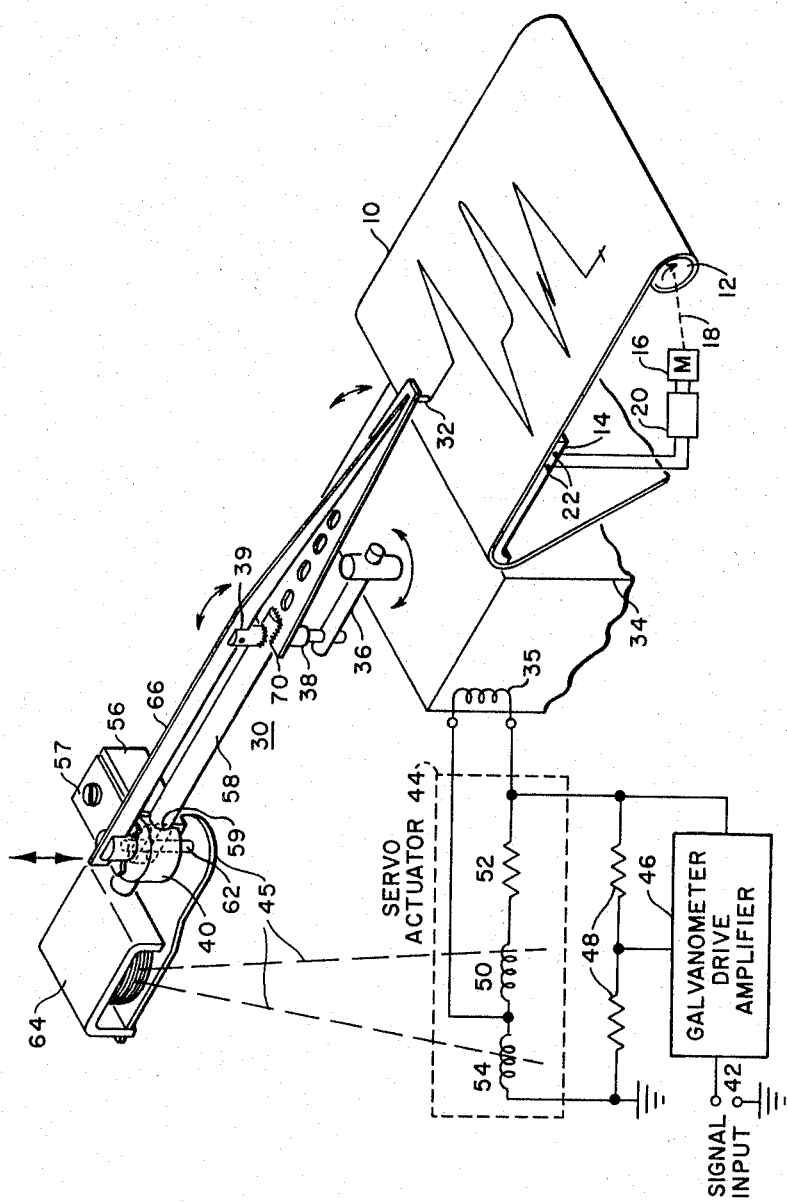

3,319,259
RECORDER WITH STYLUS PRESSURE CONTROL MEANS
Antal Hartai, Littleton, Mass., assignor to Hewlett-Packard Company, Palo Alto, Calif., a corporation of California
Filed Oct. 20, 1965, Ser. No. 498,826
11 Claims. (Cl. 346—112)

This invention relates to a recorder system and, more particularly, to an oscillographic type recorder system using heat or pressure sensitive chart records, which system provides traces of relatively uniform intensity.

Over the years many types of papers have been devised for use in both strip chart and X-Y recorders. The earliest recorders used ordinary paper and an ink pen to maintain a permanent record or visible traces of variations in the input signal or signals being recorded. Later, heat sensitive papers were developed by chemically treating or coating the paper on one or both sides with chemicals. When a discrete portion of such paper was heated to a predetermined temperature either by the stylus nib or by the paper support or platen co-acting with the stylus nib, a discoloration of such discrete portion occurred. This discoloration provided the visible trace.

Still other papers have been developed which are sensitive to pressure of the stylus nib against the paper to produce the visible trace. Both of these types of heat and pressure sensitive paper have been used quite extensively but, unfortunately, are both subject to one major disadvantage; that is, the visible trace tends to vary in intensity and width as a function of the speed of the stylus relative to the paper. The higher the speed of the stylus, the fainter the trace becomes. Actual skipping can occur. This disadvantage is particularly undesirable in oscillographic type recorders which typically cause the stylus to move at relatively high writing speeds since the input signals to be recorded normally have high frequency components. One solution to the problem has been to increase the pressure with which the stylus nib contacts the paper. This has not proven satisfactory inasmuch as it unduly loads the stylus and requires much higher driving power. Additionally, at lower speeds the trace is unduly heavy.

It is, therefore, an object of this invention to reduce many of the disadvantages of the prior art recorder systems using recording paper which is sensitive to stylus speed.

Another object of this invention is to produce tracings, on heat sensitive paper, which have a relatively constant line intensity, regardless of variations in writing speed.

Still another object of this invention is to produce tracings, on pressure sensitive paper, which have a relatively constant line width, regardless of variations in writing speed.

In accordance with a preferred embodiment of this invention these objects are achieved by providing a recorder system in which the pressure of writing stylus on heat or pressure sensitive paper is varied or modulated as a function of the speed of the stylus writing tip. Variations in chart paper speed may be accommodated by varying the temperature of the platen when necessary to properly "develop" the trace, as a function of the paper speed.

In one form of the invention a servoactuator having a nonlinear response characteristic is employed to vary the pressure of the stylus on the chart paper. In its simplest form, the servoactuator comprises a relatively simple, two-coil solenoid. The two coils of the solenoid are connected in series with each other, one of the coils being in series with the drive coil of the stylus galvanometer. The time constant of this latter coil is selected to be equal to or less than that of the galvanometer coils, whereas the time constant of the remaining coil is selected to be equal to or greater than that of the galvanometer coils. This causes the solenoid actuator motion, and hence the increase in stylus pressure, to lead the stylus speed change and to be continuously operative over the entire range of any and all step function variations of the input signal amplitude to be recorded.

In another form of the invention a conventional servoactuator having a linear response characteristic may be employed if desired.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

The sole figure is a partial schematic and partial pictorial diagram of a recorder system of the type employed in this invention.

As is shown in the right hand portion of the sole figure, a strip chart or record 10 is wound on a take-up reel 12 to be drawn across a curved platen assembly 14 from a pay-out reel (not shown). The take-up reel 12 is driven by a motor 16 through a suitable mechanical linkage 18. The speed with which the strip chart 10 is moved across the platen assembly 14 is determined by a motor speed control unit 20 of conventional type. The speed control unit 20, which may be a gauged electrical switch for applying varying signals to the rotor and/or field windings of a motor and to heater terminals 22 on the platen assembly 14. The heating terminals 22 are connected to a heating element in the platen assembly 14 so as to afford heating of the platen for purposes as will be described hereinafter. The platen assembly 14 may be any suitable type of rigid material that will afford a suitable writing surface and which is heat conductive. It may be, for example, of conductive glass. The electrical signals connected to the heater terminals 22 are varied in amplitude directly in accordance with chart speed. The amount of heat supplied the platen thus varies directly in accordance with chart speed.

The strip chart 10 may be of any suitable heat sensitive or pressure sensitive paper of which there are many types available. One type of pressure sensitive paper, for example, is available from Minnesota Mining & Mfg. Co., and is sold under the trade name "Action" paper. This particular pressure sensitive paper, while not requiring a heated platen, does have a reduced trace forming or developing time if the platen is heated. When paper not requiring heat is employed, the platen is not heated.

A stylus 30 having a tip or nib 32 in contact with the strip chart 10 is displaced by a galvanometer unit illustrated by the block 34 across the strip chart 10 in a direction transverse to the direction of the motion of the paper. The galvanometer unit 34 may be of any conventional type. One type that has been successfully employed with this invention has a drive coil and a velocity coil (not shown). The velocity coil provides a feedback signal related to the velocity of the stylus 30. The galvanometer unit 34 drives the stylus 30 through a crank arm 36 which engages a fulcrum or bearing member 38 of the stylus 30 to provide rectilinear motion to the stylus nib 32. Although a stylus 30 providing rectilinear motion to the nib 32 is illustrated, any other type capable of contacting the paper 10 may be employed. The bearing member 38 is fixedly mounted to a tubular stylus boom or arm 58. To facilitate rectilinear motion to the nib 32, the rear end of the stylus boom or arm 58 is slideably positioned in a rotatable rear bearing 40. The nib 32 of the stylus 30 is deflected transversely across the chart paper 10 in either direction in accordance with the input signal that is applied at the input terminals 42.

The input terminals 42 are connected to a galvanometer drive amplifier 46 which drives the galvanometer 34 and a servoactuator denoted by the dotted rectangle 44. The servoactuator in a preferred embodiment of the invention may be a solenoid illustrated pictorially at 64 although any other suitable, fast acting servo drive system may be employed as well. A mechanical linkage 45 between the servoactuator 44 and the stylus 30 varies the pressure of the nib 32 against the strip chart 10 directly as a function of the velocity of the nib relative to the paper. In this manner the intensity and width of the lines formed on the strip chart 10 are maintained relatively constant regardless of whether heat or pressure sensitive papers are employed.

The galvanometer drive amplifier 46 may be of any suitable type. A preferred amplifier that can be used is of the well-known potentiometric type wherein information as to the position of the nib is fed back to reduce the input signal to zero when proper displacement of the nib is attained. Such feedback information may be obtained in any well-known manner such as by a slidewire, or a capacitive pick off sensor. This position information as well as the velocity information from the velocity coil are combined and serve to vary the input signal amplitude accordingly to assist in preventing overshoot of the stylus and to facilitate its accuracy providing a trace representative of the input signal variations. A system of this type is described, for example, in U.S. Patent No. 3,088,788 issued May 7, 1963 to A. D. Brown, Jr. et al.

Although any siutable stylus 30 capable of dynamically varying nib pressure on the paper 10 may be employed, one which has been used successfully with this invention is that shown in the sole figure. In this figure the gear bearing 40 is rotatably positioned by a mounting block 56 which includes a plate 57 positioned on the top end of the rear bearing 40 to prevent its axial motion and to set the static pressure of the nib 32 on the paper 10. The bearing 40 may be formed of a suitable plastic and may be cylindrical in shape having a diametrically disposed slot 59 therein to permit the rear end of the tubular stylus boom 58 to be positioned longitudinally through the slot 59. The position of the rear bearing 40 is fixed but the bearing must be free to rotate within the mounting 56, 57.

The rear end of the stylus boom 58 is slotted at 61 to permit a driving stud 62 driven by linkage 45 (the clapper of the solenoid 64) to be moved axially within an axial bore in the rear bearing 40. The driving stud 62 in turn moves a lever arm 66 in a slot at the upper portion of the rear bearing 40 upwardly or downwardly, in the drawing, in accordance with the rate of change of the input signal and hence in accordance with the velocity of the nib 32. The lever arm 66 is pivotably mounted in a slot 39 in the fulcrum bearing 38 with one end slideably mounted in the slotted rear bearing 40 and the other end engaging the free end of an arm 70. The arm 70 is strong in the horizontal plane but flexible in the vertical plane (in the drawing) such that upward motion of the driving stud 62 causes the nib 32 to increase its pressure against the strip chart 10. The nib 32 itself may be a sapphire ball glued or cemented to the end of the arm 70. The tubular members may be constructed of suitable tube stock and the bearing members of a suitable plastic.

Although a particular type of nonlinear servoactuator 44 is illustrated, it is to be noted that any suitable servosystem having either a linear or nonlinear response may be employed so long as its response speed is sufficiently rapid to track the highest velocities of the nib 32. The increases in nib pressure desirably should precede or at least be coincident with increases in nib speed. The servosystem 44 illustrated is suitable for use with this invention and is coupled to the output of the galvanometer drive amplifier 46.

The output of the drive amplifier 46 is coupled across the drive coil 36 of the galvanometer unit 34. In turn the drive coil 36 is connected in parallel with one winding 50 of a two-winding 50 and 54 solenoid actuator (illustrated pictorially at 64 to show its mechanical connections) and a current limiting resistor 52. The remaining winding 54 of the solenoid is serially connected to the drive coil 36 and to the first winding 50 and returned to ground. The time constant of the second winding 54 of the solenoid is selected to be equal to or less than that of the galvanometer drive winding 36. This permits the pressure modulation applied to the stylus 30 to properly track and in fact precede high speed excursions of the stylus. The remaining winding 50 of the solenoid is selected to have a time constant equal to or greater than that of the galvanometer drive winding so as to maintain increased pressure of the nib 32 against the strip chart 10 throughout the period of high nib speeds.

There has thus been described a relatively novel method of maintaining the trace of a recorder relatively uniform regardless of input wave form and amplitude variations. The system is useful either with heat or pressure sensitive chart papers. Improved results may be had in many cases by simultaneously varying the platen temperature as a function of chart paper speed, particularly when heat sensitive papers are employed.

Although the invention has been described in the context of a strip chart recorder, it is to be understood that it could just as well be used with an X–Y recorder or any other type recorder using heat or pressure sensitive paper. Additionally, instead of driving the stylus against the platen as a function of nib speed, the platen may be driven against the nib as a function of nib speed.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. In a recording system of the type having record chart, a platen assembly adapted to provide a rigid support for said record chart, and a stylus associated therewith and disposed to engage a surface of said chart in the region supported by said platen assembly, thereby to make a visible trace on said chart, the combination of:

input terminals for receiving an input signal to be recorded, driving means connected to said input terminals and to said stylus for moving said stylus along the surface of said record chart at a velocity related to the rate of change of amplitude of the signal appearing on said input terminals, and electrical actuator means connected to said input terminals for varying the contact pressure between said stylus and said platen as a function of the velocity of said stylus.

2. The combination set forth in claim 1 wherein said contact pressure is varied directly but nonlinearly as a function of the velocity of said stylus.

3. The combination set forth in claim 1 wherein said contact pressure is varied directly but linearly as a function of the velocity of said stylus.

4. The combination set forth in claim 1 which includes means for moving said record chart across said platen, and means for varying the temperature of said platen in accordance with the speed of said record chart.

5. In a recording system of the type having record chart, a platen assembly adapted to provide a rigid support for said record chart, and a stylus associated therewith and disposed to engage a surface of said chart in the region supported by said platen assembly, thereby to make a visible trace on said chart, the combination of:

input terminals for receiving an input signal to be recorded, driving means connected to said input terminals and to said stylus for moving said stylus along the surface of said record chart at a velocity related to the signal appearing on said input terminals, and electrical actuator means connected to said input terminals and to said stylus for varying the contact pressure with which said stylus engages the surface of said chart as a function of the velocity of said stylus.

6. The combination set forth in claim 5 wherein the response time of said driving means to said input signal is greater than the response time of said actuator means to the velocity of said stylus.

7. The combination set forth in claim 5 wherein said driving means moves said stylus substantially in a first plane and wherein said electrical actuator means moves said stylus in a second plane intersecting said first plane.

8. The combination set forth in claim 7 wherein:
said driving means is connected to said stylus by a crank, and
said stylus includes a first bearing rotatably mounted on said crank, a first boom fixedly mounted to said bearing to move in a plane perpendicular to the axis of rotation of said bearing, a second bearing rotatably positioned, said boom being slideably positioned to pass diametrically through said bearing, and a lever arm pivoted at said first bearing and adapted to be axially positioned by said actuator means relative to said second bearing to vary the pressure of engagement of said stylus with said chart.

9. The combination set forth in claim 8 wherein said stylus comprises:

a second flexible boom fixedly mounted at one end to said second bearing so as to flex in said second plane, and a nib attached to the free end of said second boom adapted to engage said record chart,
said lever arm slideably engaging the free end of said second boom.

10. The combination set forth in claim 5 wherein said driving means includes:
a galvanometer drive coil, and
wherein said electrical actuator means comprises a solenoid having first and second windings coupled in series across said input terminals,
said galvanometer drive coil being connected in parallel with said first winding.

11. The combination set forth in claim 10 wherein said first winding has a time constant equal to or greater than that of said galvanometer drive coil and said second winding has a time constant equal to or less than that of said galvanometer drive coil.

References Cited by the Examiner
UNITED STATES PATENTS

| | | | |
|---|---|---|---|
| 2,454,966 | 11/1948 | Faus | 346—112 |
| 2,644,738 | 7/1953 | Gardner | 346—76 |
| 2,955,895 | 10/1960 | Buoymaster et al. | 346—76 |
| 3,169,821 | 2/1965 | Miller | 346—140 |

RICHARD B. WILKINSON, *Primary Examiner.*

J. W. HARTARY, *Assistant Examiner.*